(12) United States Patent
Demir et al.

(10) Patent No.: US 7,466,914 B2
(45) Date of Patent: Dec. 16, 2008

(54) OPTOELECTRONIC SWITCH HAVING CASCADED OPTICAL NODES

(75) Inventors: Hilml Volkan Demir, Stanford, CA (US); David A. B. Miller, Stanford, CA (US); Vijit Ashok Sabnis, Los Altos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 567 days.

(21) Appl. No.: 11/337,088

(22) Filed: Jan. 19, 2006

(65) Prior Publication Data
US 2008/0247753 A1 Oct. 9, 2008

Related U.S. Application Data

(60) Provisional application No. 60/646,069, filed on Jan. 21, 2005.

(51) Int. Cl.
*H04J 14/00* (2006.01)
(52) U.S. Cl. ...................................................... 398/47
(58) Field of Classification Search .................. 398/45, 398/47, 50
See application file for complete search history.

(56) References Cited

U.S. PATENT DOCUMENTS

| 4,074,142 | A | 2/1978 | Jackson | 250/551 |
| 4,953,155 | A | 8/1990 | Tangonan et al. | 370/1 |
| 5,037,173 | A | 8/1991 | Sampsell et al. | 385/17 |
| 5,072,439 | A | 12/1991 | Forrest et al. | 359/115 |
| 5,283,844 | A | 2/1994 | Rice et al. | 385/17 |
| 5,345,326 | A | 9/1994 | Araki | 359/117 |
| 6,680,791 | B2 | 1/2004 | Demir et al. | 359/248 |
| 2002/0163693 | A1* | 11/2002 | Rubissa et al. | 359/128 |

* cited by examiner

*Primary Examiner*—Shi K Li
(74) *Attorney, Agent, or Firm*—Lumen Patent Firm

(57) ABSTRACT

An optical switch assembly is provided having a plurality of optoelectronic switching nodes. Each node is a three terminal optical device having a first optical input, a second optical input and an optical output. Each node can be electrically activated or deactivated via an electrical control input. Each node has a transmittance between its second optical input and its optical output. This transmittance depends on the signal at the first optical input if the node is activated, and is independent of the first optical input if the node is deactivated. Thus modulation at the first optical input can be selectively imposed on the optical output. The switch includes at least two chains of nodes, each chain having two or more nodes connected in series such that each pair of adjacent nodes is connected from optical output to second optical input. Switches according to the invention can be configured as optical crossbar switches or optical routers.

15 Claims, 3 Drawing Sheets

OPTOELECTRONIC SWITCH HAVING CASCADED OPTICAL NODES

CROSS REFERENCE TO RELATED APPLICATIONS

This application claims the benefit of U.S. provisional application 60/646,069, filed on Jan. 21, 2005, entitled "Optical Networks with Optoelectronic Semiconductor Devices Operated by Modulated Absorption", and hereby incorporated by reference in its entirety.

FIELD OF THE INVENTION

This invention relates to optical switching.

BACKGROUND

Optical communication systems frequently require provision of optical switching and/or routing functionality. Accordingly, the extensive development and implementation of optical communication systems and networks has driven the development of various optical switching approaches and architectures, including optical crossbar switches and optical routers. A crossbar switch has M inputs and N outputs (frequently M=N, although this is not required), and is able to connect each of its inputs to any, some, or all of its outputs. Providing this level of switching flexibility is nontrivial, and conventional crossbar approaches tend to have difficulty in scaling to large M and N, especially for optical signals that are modulated at a high data rate. Various conventional crossbar switch approaches can be distinguished based on switch architecture and how/if o/e or e/o (optical to electrical or electrical to optical) conversion is performed.

For example, U.S. Pat. No. 4,074,142 considers a crossbar switch having electrical inputs and outputs. Each input is e/o converted and then optically delivered to each of N output modules by a passive optical system, where o/e conversion is performed. Switching is provided by electrically selecting which of the output module inputs is output from each module.

Another example is considered in U.S. Pat. No. 4,953,155, where the switch has optical inputs and electrical outputs. Each optical input is split (e.g., with a fiber splitter) and delivered to an array of detectors arranged in N rows, such that each row has M detectors, one for each optical input. The detectors can be selectively activated to provide switching functionality.

Another crossbar switch is considered in U.S. Pat. No. 5,037,173 which has optical inputs and outputs. Switching is performed with a spatial light modulator (e.g., a deformable mirror device).

In U.S. Pat. No. 5,072,439, a switch having optical inputs and electrical outputs is considered. Each optical input is routed to a separate detector. Selective activation and deactivation of these detectors can be employed to select which optical signal drives the switch output.

U.S. Pat. No. 5,283,844 considers a switch having optical inputs and outputs where switching is performed by altering transmission paths through a network of optical waveguides with total internal reflectance turning mirrors.

U.S. Pat. No. 5,345,326 considers a switch having optical inputs and outputs where switching is performed by splitting the optical inputs, passing each split optical input through an optoelectronic modulator, and then recombining the modulated optical signals to form optical outputs.

U.S. Pat. No. 6,680,791 considers a switch having optical inputs and outputs, where the optical inputs to the switch are o/e converted and electrically distributed to switching elements. The switching elements thus share their inputs. The switching elements also have optical inputs and outputs, and the transmittance from input to output depends on the electrical signal provided to the switching element, thereby providing switching.

In general terms, conventional switch approaches which incorporate o/e conversion followed by electrical switching tend to face difficulties relating to electrical crosstalk and isolation, especially for large switches. Conventional all-optical switch approaches tend to face difficulties with the optical switching element(s), especially for large switches.

Accordingly, it would be an advance in the art to provide optical switching having an improved scalability to large numbers of inputs and outputs.

SUMMARY

An optical switch assembly is provided having a plurality of optoelectronic switching nodes. Each node is a three terminal optical device having a first optical input, a second optical input and an optical output. Each node can be electrically activated or deactivated via an electrical control input. Each node has a transmittance between its second optical input and its optical output. This transmittance depends on the signal at the first optical input if the node is activated, and is independent of the first optical input if the node is deactivated. Thus modulation at the first optical input can be selectively imposed on the optical output. The switch includes at least two chains of nodes, each chain having two or more nodes connected in series such that each pair of adjacent nodes is connected from optical output to second optical input. Switches according to the invention can be configured as optical crossbar switches or optical routers.

A key advantage of the invention is that the electrical bandwidth of each node can be made independent of the number of nodes in the switch, which greatly facilitates scaling to switches having a large number of inputs and outputs. Further advantages and applications of the invention follow from the flexibility provided by the three-terminal nodes. For example, embodiments of the invention can provide retiming, polarization control, heterodyne mixing, signal monitoring and/or optical clock recovery in combination with switching.

DETAILED DESCRIPTION

Figure 1:
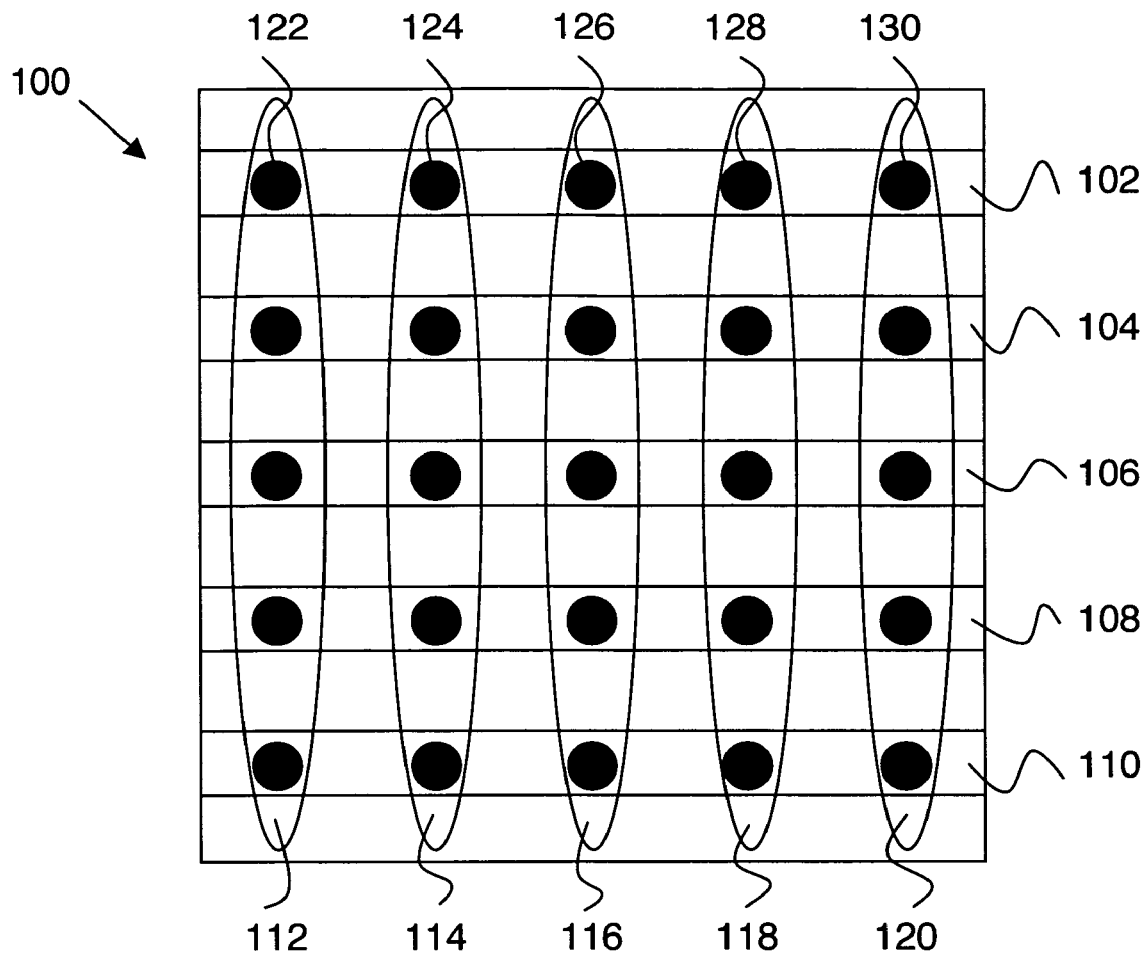
FIG. 1 shows an optical switch assembly according to an embodiment of the invention.

FIG. 1 shows an optical crossbar switch 100 according to an exemplary embodiment of the invention. Switch 100 includes five optical waveguides 102, 104, 106, 108 and 110. Each waveguide includes five optoelectronic nodes. For example, waveguide 102 includes nodes 122, 124, 126, 128, and 130. Similarly, each of the other waveguides also includes five nodes. The switch as a whole therefore includes 25 nodes. Optical switch inputs 112, 114, 116, 118, and 120 are provided to switch 100 such that each waveguide receives each optical input at one of its nodes.

Figure 2A:
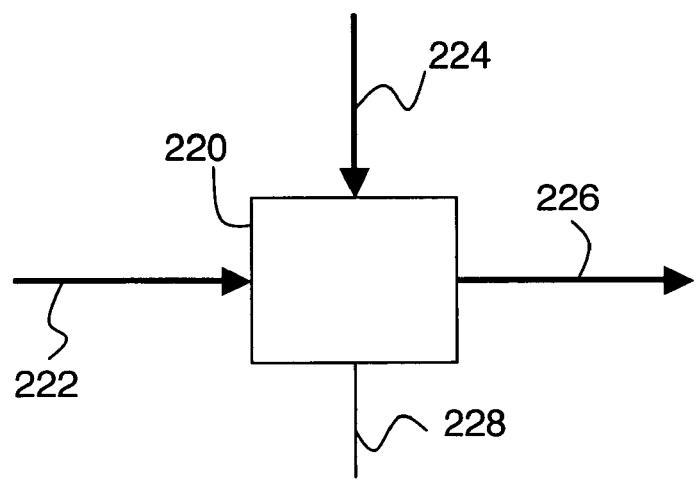
FIG. 2a is a block diagram of an optoelectronic node suitable for use in embodiments of the invention.

The functionality of the nodes is shown in the block diagram of FIG. 2a. A node 220 has a first optical input 224, a second optical input 222, and an optical output 226. Node 220 can be electrically activated or electrically deactivated by an electrical control input 228. Of the optical radiation provided to second optical input 222, some, all or none of this radiation is emitted from optical output 226. Thus node 220 has a transmittance between second input 222 and output 226. The value of this transmittance depends on the optical signal provided to first optical input 224. Thus node 220 can be regarded as an optical modulator having an optical modulation input as opposed to the more common electrical modulation input. The preceding description of node functionality applies when the node is electrically activated by electrical input 228. When node 220 is electrically deactivated, the transmittance from second input 222 to output 226 does not depend on the optical signal present at first input 224. Accordingly, output radiation emitted from output 226 is modulated or not modulated according to modulation of radiation at first optical input 224 when the node is activated or deactivated respectively.

Node 220 can be regarded as an optical transistor, since first optical input 224 is analogous to a transistor base or gate, second optical input 222 is analogous to a transistor emitter or source, and optical output 226 is analogous to a transistor collector or drain. The flexibility provided by such three terminal optical devices is illustrated in the switch of FIG. 1. Here waveguides 102-110 include the second optical inputs and optical outputs of each node. Thus each waveguide is effectively a "chain" of nodes connected in series such that each pair of adjacent nodes is connected from optical output to second optical input. Furthermore, the first optical inputs of each node are isolated (i.e., each node has an independent first optical input). In the example of FIG. 1, optical inputs 112-120 are provided to the first optical inputs of each node by illuminating the array of nodes from above such that the beam spots for each input 112-120 are roughly as shown. More specifically, each optical input is broadcast to the chains such that each chain receives each of the optical switch inputs at the first optical input of one of its nodes.

In operation, input radiation is provided to one end of each of waveguides 102-110, and output radiation is emitted from the other end of each waveguide. In the example of FIG. 1, such radiation propagates from left to right (or from right to left). Selective activation of switch nodes allows for modulation of any of inputs 122-130 to be imposed on any or all of the outputs from waveguide 102-110, thereby providing a crossbar switch. For example, if node 126 is activated, modulation from input 116 is imposed on the output from waveguide 102. If nodes 122, 124, 128, and 130 are deactivated, they have no effect on the modulation at the output of waveguide 102. Although the example of FIG. 1 shows a 5×5 switch, crossbar switches according to the invention can have any number of inputs and outputs (e.g., M inputs, N outputs).

Figure 2B:
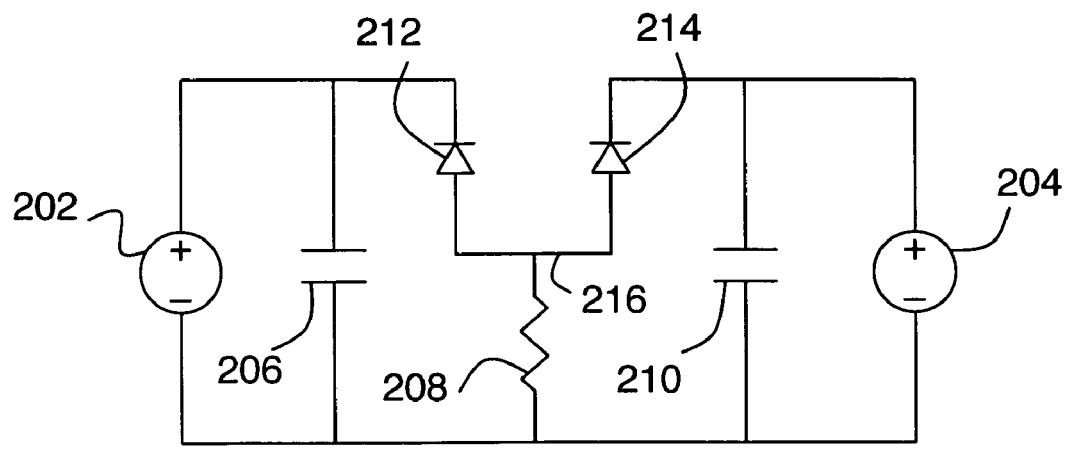
FIG. 2b is a schematic circuit diagram of an optoelectronic node suitable for use in embodiments of the invention.

Although the invention can be practiced with any optical nodes providing the functionality described in connection with FIG. 2a, each node is preferably an integrated circuit including a photodetector receiving the first optical input and a modulator receiving the second optical input. FIG. 2b shows a schematic of a suitable node 220 for practicing the invention. Here a photodetector 212 and a modulator 214 are connected via a high speed electrical connection 216.

A high speed electrical connection can be constructed in a first method by making a connection with electrical wires whose length is short compared to the distance propagated by light in the switching time duration of interest. Preferably in this first method the capacitance of this line is minimized to the extent practical, so as to reduce the optical power requirements on any optoelectronic devices used to drive electrical signals along this connection. A high speed electrical connection can be constructed in a second method in which the electrical connecting wires form a transmission line that is terminated with a resistor whose resistance is substantially equal to the characteristic impedance of said transmission line. Methods of designing and making high speed electrical connections are well known to those skilled in the art.

Voltage sources 202 and 204 provide bias for detector 212 and modulator 214 across bypass capacitors 206 and 210 respectively. A thin film resistor 208 completes the circuit. Electrical activation and deactivation of the node can be accomplished by appropriately altering the biases provided by voltage sources 202 and 204. Each node is electrically isolated from all other nodes, allowing the nodes to operate independently of each other. Modulator 214 is preferably a semiconductor quantum well modulator.

In operation, high-speed electrical signals are localized to detector 212 and modulator 214, since capacitors 206 and 210 act as short circuits for high frequency signals. This is highly advantageous in practice, since the switching bandwidth is mainly determined by the capacitances of detector 212 and modulator 214 (in parallel) and the resistance of resistor 208. Despite the presence of other nodes, the operation of each node (especially its bandwidth) remains the same. In particular, the switching bandwidth can be independent of the number of nodes in the switch. A large scale optoelectronic integrated circuit can include all nodes of a switch. Further details relating to integrated detector/modulator combinations suitable for practicing the invention are provided in U.S. Pat. No. 6,680,791.

To make use of the nodes of FIG. 2b in the switch of FIG. 1, detector 212 is configured to receive a free-space optical beam as first optical input 224, while modulator 214 is configured to receive a waveguide optical input as second optical input 222 and to provide a waveguide output as optical output 226. The invention can also be practiced with any other combination of waveguide and/or free space optical coupling for the optical inputs and outputs.

Figure 3:
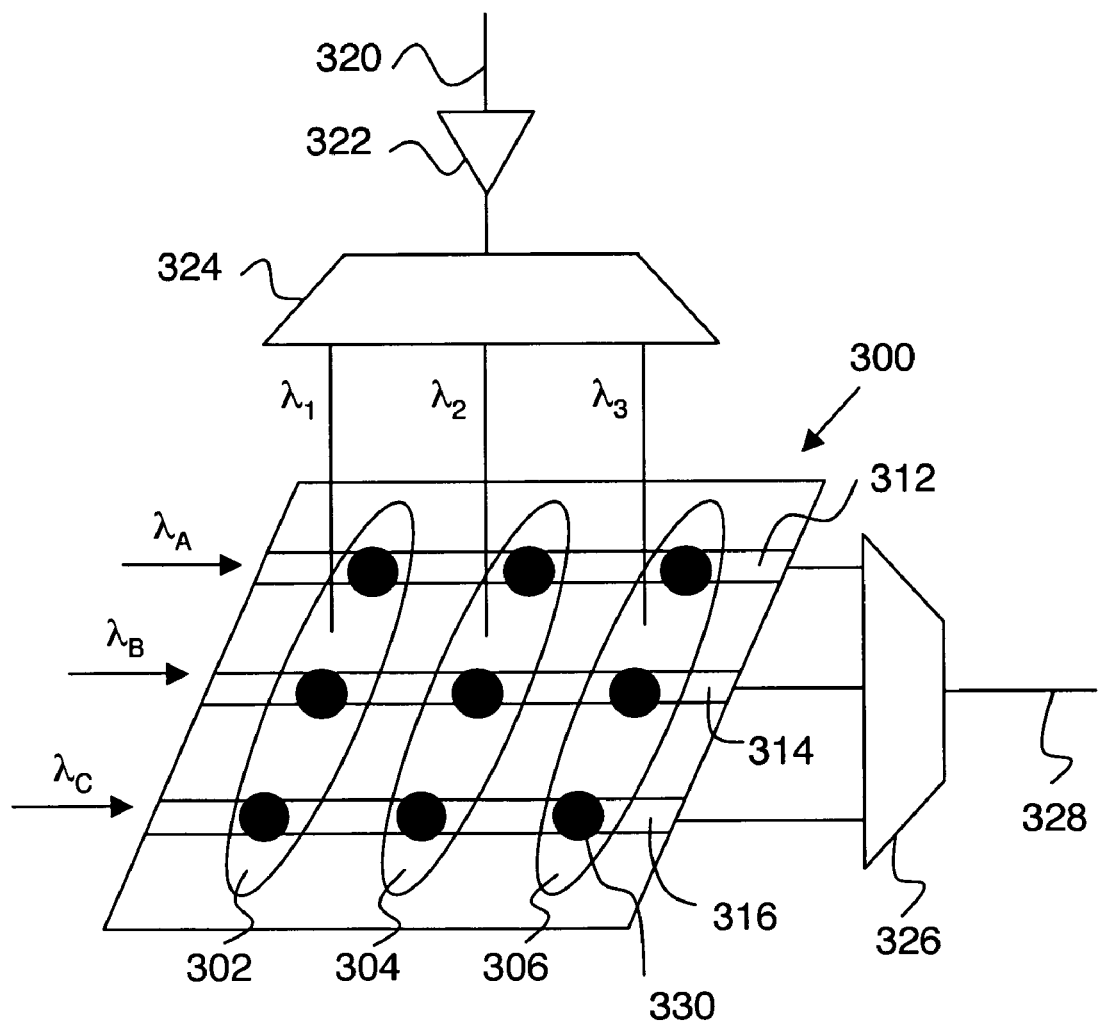
FIG. 3 shows an example of an optical crossbar switch according to an embodiment of the invention incorporated into a WDM optical network.

FIG. 3 shows an example of an optical crossbar switch according to an embodiment of the invention incorporated into a wavelength-division multiplexing (WDM) optical network. In the example of FIG. 3, a WDM input 320 is provided to an optical amplifier 322 (e.g., a fiber amplifier or a semiconductor amplifier) whose output is directed to a wavelength demultiplexer 324. Demultiplexer 324 provides three optical beams 302, 304 and 306, having wavelengths $\mu_1$, $\lambda_2$, and $\lambda_3$ respectively. A switching assembly 300 is included and operates as described in connection with FIG. 1. The inputs to waveguides 312, 314 and 316 are at wavelengths $\lambda_A$, $\lambda_B$, and $\lambda_C$ respectively. The outputs of waveguides 312, 314 and 316 are provided to a multiplexer 326 which provides a WDM output 328. An input signal at one wavelength (e.g., $\lambda_1$) can thereby be switched to other wavelength(s) (e.g., $\lambda_A$, $\lambda_B$, and/or $\lambda_C$). For example, if node 330 is activated, the signal at $\lambda_3$ is switched to $\lambda_C$. Such flexible wavelength switching capability is often required in WDM applications. The input and output wavelength sets can be the same set or can include different wavelengths. The invention can be practiced with any number of WDM inputs and outputs.

Figure 4:
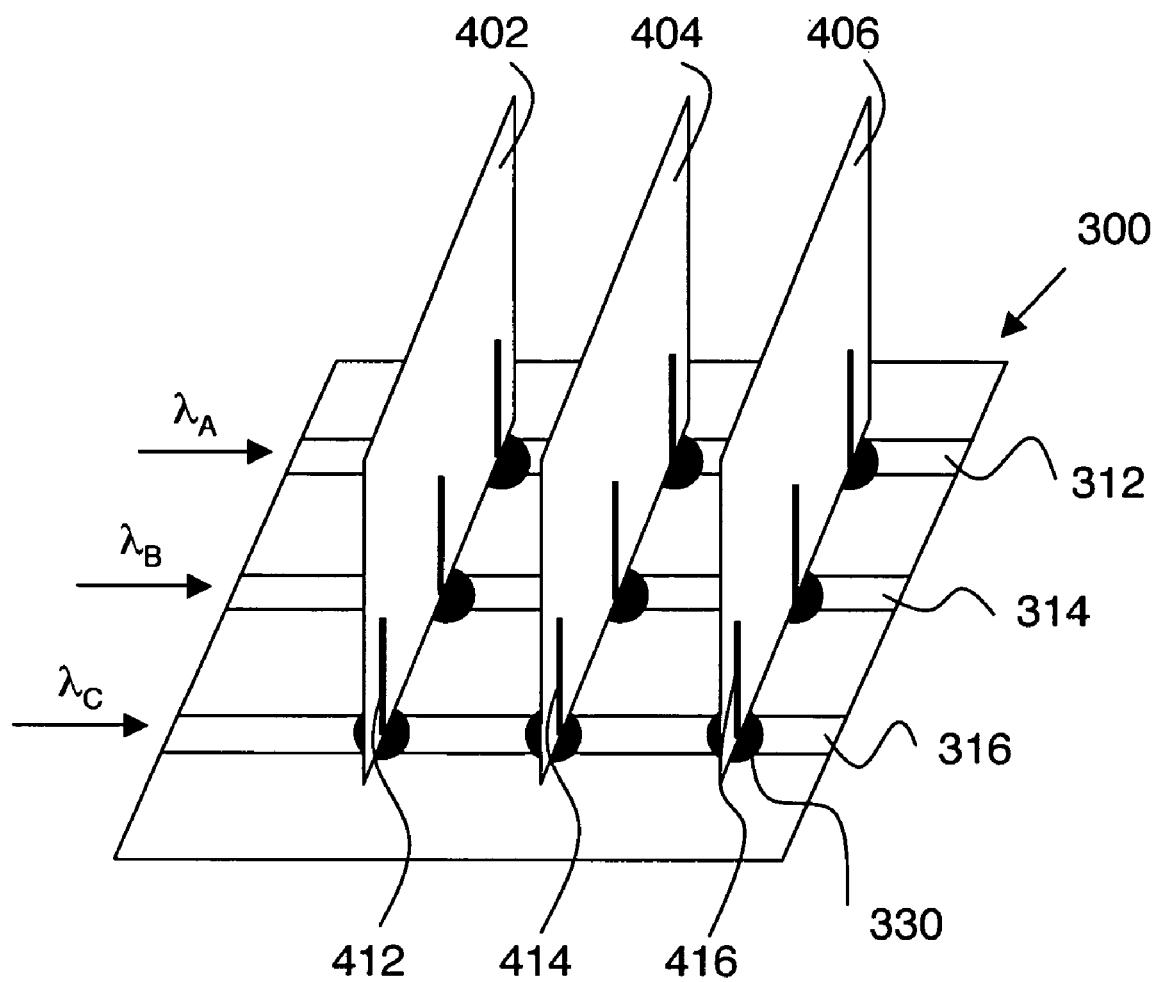
FIG. 4 show an example of an optical router according to an embodiment of the invention.

FIG. 4 show an example of an optical router according to an embodiment of the invention. Here an optical switch assembly 300 receives its first optical inputs from line cards 402, 404, and 406. These line cards include circuitry for header recognition and forwarding decisions. Each line card in this example has three optical outputs (heavy lines), and each waveguide of the switch assembly receives an input from each line card. For example, waveguide 316 receives inputs 412, 414, and 416 from line cards 402, 404, and 406 respectively. The line card outputs can be selectively switched to the optical carriers (at wavelengths $\lambda_A$, $\lambda_B$, and $\lambda_C$) responsive to header information provided by the line cards. Since switching assembly 300 can be scaled to large numbers of inputs and outputs, such a router can handle large aggregate transmission bandwidth.

Optical switching assemblies according to the invention can also perform other useful functions, in addition to the switching functionality described in the preceding examples.

Reduction of signal jitter or skew (i.e., retiming or reduction of timing error) can be accomplished in various ways according to the invention. One method is to provide a regular train of pulses (at the system clock rate) to the second optical inputs of each switch node. Skew or jitter in the signals provided to the first optical inputs of each node is thereby reduced, since the variable leading and trailing edges of pulses at the first optical inputs will not overlap with the pulses at the second optical inputs, and will thereby be suppressed. The skew and jitter must be substantially less than a clock period for this approach to be practical, but conventional retiming techniques tend to have the same requirement. For long haul propagation, retiming is typically performed periodically as needed in order to avoid accumulation of skew and jitter to uncorrectable levels.

Several aspects of pulsed optical signals in switches according to embodiments of the invention are noteworthy. The pulse energy is preferably selected such that saturation is avoided in the active region of the modulator. The optical pulses provided to the second optical inputs (i.e., pulses in the pulse train) should be shorter than the incoming data stream bits (at the first optical inputs). Suitable sources for such pulse trains are known in the art (e.g., mode-locked lasers). The pulse train also must be synchronized with the incoming data stream according to an optical clock recovery method. For example, a mode-locked laser can be phase locked to the data stream input, or a variable delay can be provided in the pulse train.

It is also possible to electrically gate the nodes of the switch (e.g. with electrical control inputs 228) to provide retiming. In this approach, the node is electrically gated with an appropriately synchronized electrical control signal (e.g., by turning the modulator of the node on and off). For example, an electrical clock recovery signal can be used to gate the nodes. Here also, the variable leading and trailing pulse edges at the first optical input will be suppressed. In general, the ability to electrically activate and deactivate the nodes provides the flexibility to gate the nodes with any desired gating function.

Another application of switches of the invention is to polarization control. In particular, the state of polarization at the first optical inputs of each node will typically be unknown (e.g., from propagation through standard optical fiber). In contrast, the state of polarization at the second optical inputs and optical outputs of each node can be predetermined (e.g., if the nodes are waveguide coupled as on FIG. 1 and the waveguide only supports a single mode having a known state of polarization). Such a switch provides the useful function of converting an unknown state of polarization to a known predetermined state of polarization.

A further application of switches according to the invention is heterodyne mixing. If radiation at two or more closely spaced optical wavelengths is provided to the first optical input of a node of FIG. 2, the optical output of the node will be heterodyne modulated if the frequency difference of the optical wavelengths is within the electrical bandwidth of the node. For example, if two wavelengths having a frequency difference of $\Delta f$ are input to the first optical input of a node, then the node output will be modulated at a frequency of $\Delta f$, provided $\Delta f$ is in-band. If the node modulator is linear, then this modulation will be sinusoidal. If the node modulator is nonlinear, the output waveform will tend to look more like a pulse train. The pulse width tends to decrease as the modulator nonlinearity increases. This effect can be exploited to provide ps-scale pulses having a frequency of tens of GHz, which can be useful for optical clock generation.

Another application of switches according to the invention is to signal monitoring. Typical parameters for monitoring include power level, modulation depth, signal integrity and clock frequency. Monitoring can be provided by adding an electrical monitoring output to at least one of the nodes of a switch. The electrical monitoring output is typically driven by an electrical signal derived from the first optical input (since optical to electrical conversion is performed at this input). Methods for deriving useful monitoring information from the electrical monitoring output are well known in the art. This capability of the invention provides a significant advantage compared to all-optical switching approaches where it is much more difficult to implement signal monitoring.

A further application of switches according to the invention is to optical clock recovery. For example, a portion of a node output can be fed back to its first optical input to establish a closed optical loop for phase-locking. Here a CW optical signal is provided at the modulator input (second node input) and a data stream is provided to the detector (first node input). Gain and/or a time delay may be needed in such a loop to provide stable, synchronized operation. Clock recovery in this manner can be combined with retiming as described above. For example, a first node can be configured to recover the clock and provide its pulsed clock output to the second optical input of a second node.

The invention claimed is:

1. An optical switch assembly comprising:
   a plurality of optoelectronic nodes, wherein each node has a first optical input, a second optical input, and an optical output, wherein each node can be electrically activated or deactivated via an electrical control input, wherein radiation provided to the second optical input is emitted from the optical output as output radiation, wherein the output radiation is modulated according to modulation of radiation provided to the first optical input if the node is electrically activated, and wherein the output radiation is not modulated according to modulation of radiation provided to the first optical input if the node is not electrically activated;
   wherein the switch includes a plurality of linear chains of the optoelectronic nodes, wherein each of the chains includes two or more nodes optically connected in series such that each pair of adjacent nodes is connected from optical output to second optical input; and
   wherein the first optical inputs of each of the nodes are isolated from each other.

2. The assembly of claim 1, wherein said plurality of linear chains comprises N chains, each having M nodes, and
   wherein M optical switch inputs are broadcast to said chains such that each chain receives each of the M optical switch inputs at the first optical input of one of its nodes, whereby an optical crossbar switch having M inputs and N outputs is provided.

3. The assembly of claim 2, further comprising a wavelength division demultiplexer providing said M optical switch inputs at M different input wavelengths and a wavelength division multiplexer combining said N outputs into a single multiplexed output, wherein said N outputs are at N different output wavelengths.

4. The assembly of claim 1, wherein said plurality of linear chains comprises N chains, each having M nodes, and further comprising M line cards each having N line card optical outputs, wherein each chain receives a line card optical output from each of the M line cards at the first optical input of one of its nodes.

5. The assembly of claim 1, wherein said optical outputs and said second optical inputs of each of said nodes are waveguide coupled, and wherein said first optical inputs of each of said nodes are free-space coupled.

6. The assembly of claim 1, wherein each of said nodes comprises a photodetector coupled to said first optical input and a modulator receiving said second optical input and providing said optical output, and wherein said photodetector is electrically connected to said modulator via a high speed electrical connection.

7. The assembly of claim 6, wherein said photodetectors and said modulators for all of said nodes are monolithically integrated.

8. The assembly of claim 1, wherein said nodes are electrically isolated from each other.

9. The assembly of claim 1, wherein optical inputs provided to said second optical inputs of said nodes are pulsed, whereby timing errors in signals provided to said first optical inputs can be reduced.

10. The assembly of claim 1, wherein said electrical control inputs are modulated to reduce timing errors in signals provided to said first optical inputs.

11. The assembly of claim 1, wherein radiation provided to said first optical inputs has an unknown state of polarization and wherein radiation emitted from said optical outputs has a predetermined state of polarization.

12. The assembly of claim 1, wherein radiation at two or more closely spaced optical wavelengths is provided to said first optical inputs, whereby radiation from said optical outputs is heterodyne modulated.

13. The assembly of claim 1, wherein at least one of said nodes further comprises an electrical monitoring output, whereby monitoring of said assembly is provided.

14. The assembly of claim 1, wherein at least one of said nodes further comprises a feedback path from said optical output to said first optical input, whereby optical clock recovery is provided.

15. A method for optical switching comprising:

providing a plurality of optoelectronic nodes, wherein each node has a first optical input, a second optical input, and an optical output, wherein radiation provided to the second optical input is emitted from the optical output as output radiation and wherein the first optical inputs of each of the nodes are isolated from each other;

selectively activating and deactivating each node with a corresponding electrical control input, wherein the output radiation is modulated according to modulation of radiation provided to the first optical input if the node is electrically activated, and wherein the output radiation is not modulated according to modulation of radiation provided to the first optical input if the node is not electrically activated; and arranging the nodes in a plurality of linear chains of the nodes, wherein each of the chains includes two or more nodes optically connected in series such that each pair of adjacent nodes is connected from optical output to second optical input.

* * * * *